Aug. 21, 1923. 1,465,681
H. PARTRIDGE
SPRINKLER NOZZLE
Filed May 2, 1922
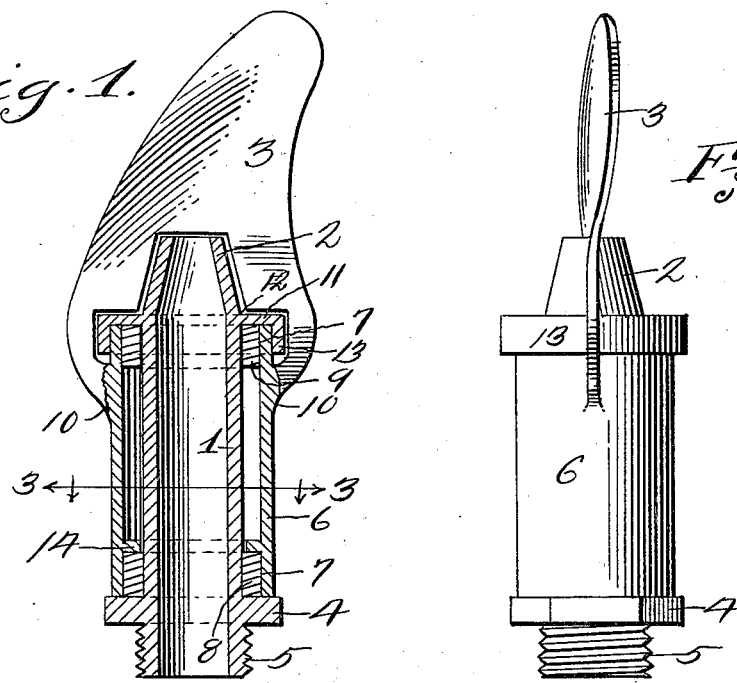
Fig. 1.
Fig. 2.
Fig. 3.
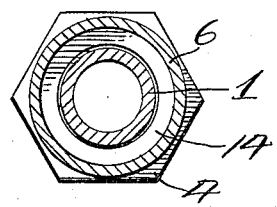
Inventor
Hugh Partridge
By Philip A. H. Sorrell
Attorney Patented Aug. 21, 1923.

1,465,681

UNITED STATES PATENT OFFICE.

HUGH PARTRIDGE, OF JACKSONVILLE, FLORIDA.

SPRINKLER NOZZLE.

Application filed May 2, 1922. Serial No. 558,025.

*To all whom it may concern:*

Be it known that HUGH PARTRIDGE, citizen of the United States, residing at Jacksonville, in the county of Duval and State of Florida, has invented certain new and useful Improvements in Sprinkler Nozzles, of which the following is a specification, reference being had therein to the accompanying drawings.

The invention relates to sprinkler nozzles of the type used in connection with garden hose and has for its object to provide a device of this character wherein spaced thrust rings are used for supporting a cylindrical member rotatably mounted on the main body of the nozzle thereby preventing the necessity of using lubricant. Also to provide the main body of the nozzle with a flanged hood, which entirely houses the bearing adjacent the discharge end of the nozzle, thereby preventing water from entering the bearings as it is spread by the spreader plate.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a vertical sectional view through the nozzle.

Figure 2 is a side elevation of the nozzle.

Figure 3 is a horizontal sectional view taken on line 3—3 of Figure 1.

Referring to the drawing, the numeral 1 designates a cylindrical spraying nozzle, the upper end of which terminates in a tapered discharge end 2 which discharges water against the spreader plate 3 in such a manner that said spreader plate is revolved. The lower end of the nozzle 1 is provided with an integral nut receiving flange 4 and a hose attaching threaded portion 5, whereby the nozzle may be easily attached to a conventional form of garden hose. Surrounding the nozzle 1 is a sleeve 6 which is spaced from the nozzle and has secured thereto by brazing at 7 bearing rings 8 and 9, said bearing rings having a sliding engagement with the nozzle 1 whereby the sleeve 6 may easily rotate when the spreader plate is rotated during a spraying operation, said spreader plate being preferably welded at 10 to opposite sides of the sleeve 6. It has been found that where ball bearings and the like are used that they corrode easily and consequently the device is rendered inoperative even if oiled. The bearing rings 8 and 9 do not require lubricant and water is excluded therefrom by means of the outwardly extending annular flange 11, which is preferably brazed to the nozzle 1 at 12, and terminates in an annular downwardly extending flange 13, which engages over the upper end of the sleeve 6, therefore it will be seen that water will be prevented from entering the bearing and that said bearings will not need lubricant. To prevent longitudinal binding of the sleeve 6, the nozzle 1 is provided with a thrust flange 14 which engages the upper side of the bearing ring 8.

From the above it will be seen that a sprinkler nozzle is provided with a spreader plate carrying sleeve, which may easily rotate and at the same time hooded in such a manner that when the device is in vertical position during a sprinkling operation water will be prevented from entering the bearing, thereby obviating the necessity of lubricating the device from time to time.

The invention having been set forth what is claimed as new and useful is:—

1. A sprinkler nozzle comprising a cylindrical body, spaced flanges carried by said cylindrical body, a sleeve surrounding the cylindrical body and having its ends terminating adjacent the spaced flanges, bearing rings disposed within the sleeve adjacent its ends and carried thereby, one of said spaced flanges being provided with an annular flange overlying the end of the sleeve, a spreader plate carried by said sleeve and arching the end of the cylindrical body, an inwardly extending annular flange carried by the sleeve and overlying the inner end of one of the bearing rings.

2. A sprinkler nozzle comprising a cylindrical body, a rotative sleeve surrounding said cylindrical body and spaced therefrom, bearing rings carried by the sleeve adjacent its ends and between the sleeve and the cylindrical body, a hood carried by the cylindrical body and arching one end of the sleeve, a spreader plate carried by said sleeve, a thrust ring carried by the sleeve and extending inwardly and overlying the inner end of one of the bearing rings.

In testimony whereof I hereunto affix my signature.

HUGH PARTRIDGE.